(12) United States Patent
Shaffer

(10) Patent No.: US 6,176,082 B1
(45) Date of Patent: Jan. 23, 2001

(54) EXHAUST MANIFOLD COOLING ASSEMBLY FOR AN INTERNAL COMBUSTION ENGINE

(75) Inventor: Bradley J. Shaffer, Romney, IN (US)

(73) Assignee: Caterpillar Inc., Peoria, IL (US)

( * ) Notice: Under 35 U.S.C. 154(b), the term of this patent shall be extended for 0 days.

(21) Appl. No.: 09/296,210

(22) Filed: Apr. 21, 1999

(51) Int. Cl.[7] .................................................. F01N 3/02
(52) U.S. Cl. ..................................... 60/321; 60/614
(58) Field of Search ............................. 60/280, 320, 321, 60/614

(56) References Cited

U.S. PATENT DOCUMENTS

| | | |
|---|---|---|
| 1,284,643 | 11/1918 | Francisco . |
| 1,478,403 | 12/1923 | Sainsbury . |
| 1,771,371 | 7/1930 | Bovey . |
| 2,072,763 | 3/1937 | Mayo ................................... 237/12.3 |
| 2,143,212 | 1/1939 | Reichle ............................... 237/12.3 |
| 2,479,029 | 8/1949 | Sutphin ............................... 257/241 |
| 2,501,512 | 3/1950 | Hausladen ......................... 237/12.3 |
| 3,043,098 | 7/1962 | Hannon ................................. 60/31 |
| 3,169,365 | * 2/1965 | Benjamen .............................. 60/321 |
| 3,206,836 | * 9/1965 | Schlussler .............................. 60/321 |
| 3,211,374 | 10/1965 | Matulaitis ............................... 237/8 |
| 3,324,533 | 6/1967 | Watteau .............................. 29/156.4 |
| 3,357,413 | 12/1967 | Quinton ............................. 123/41.05 |
| 3,485,040 | * 12/1969 | Niskanen .............................. 60/321 |
| 3,501,095 | 3/1970 | Peterson ............................. 237/12.3 |
| 3,561,210 | * 2/1971 | Wiseman, Jr. ......................... 60/321 |
| 3,734,170 | * 5/1973 | Pace ..................................... 60/321 |
| 3,780,712 | * 12/1973 | Pace ..................................... 60/321 |
| 3,948,052 | * 4/1976 | Merkle et al. ......................... 60/321 |
| 4,096,616 | 6/1978 | Coffinberry ...................... 29/157.3 A |
| 4,293,094 | 10/1981 | McGillis ............................... 237/55 |
| 4,458,491 | 7/1984 | Deutschmann ........................ 60/612 |
| 4,559,908 | 12/1985 | Flaig et al. ......................... 123/41.28 |
| 4,711,088 | * 12/1987 | Berchem et al. ...................... 60/321 |
| 4,759,180 | * 7/1988 | Rognon ................................. 60/321 |
| 4,991,546 | * 2/1991 | Yoshimura ............................ 60/321 |
| 5,048,467 | * 9/1991 | Kojima ................................. 60/321 |
| 5,143,151 | 9/1992 | Pain ..................................... 165/154 |
| 5,174,369 | 12/1992 | Glass ................................... 165/155 |
| 5,337,559 | * 8/1994 | Deutschmann ........................ 60/321 |
| 5,463,867 | * 11/1995 | Ruetz ................................... 60/321 |

* cited by examiner

*Primary Examiner*—Teresa Walberg
*Assistant Examiner*—Fadi H. Dahbour
(74) *Attorney, Agent, or Firm*—James B. Golden; Alan J. Hickman

(57) ABSTRACT

An exhaust manifold cooling assembly for an internal combustion engine having a turbocharger, an exhaust a manifold, heat exchanger, and an outer shell. Exhaust gas from the engine passes through the exhaust manifold, the turbocharger, and the heat exchanger. The cooled exhaust gases pass through a cooling passageway disposed about, generally surrounding and spaced from the exhaust manifold. Heat is further absorbed by the cooling exhaust gasses.

16 Claims, 2 Drawing Sheets

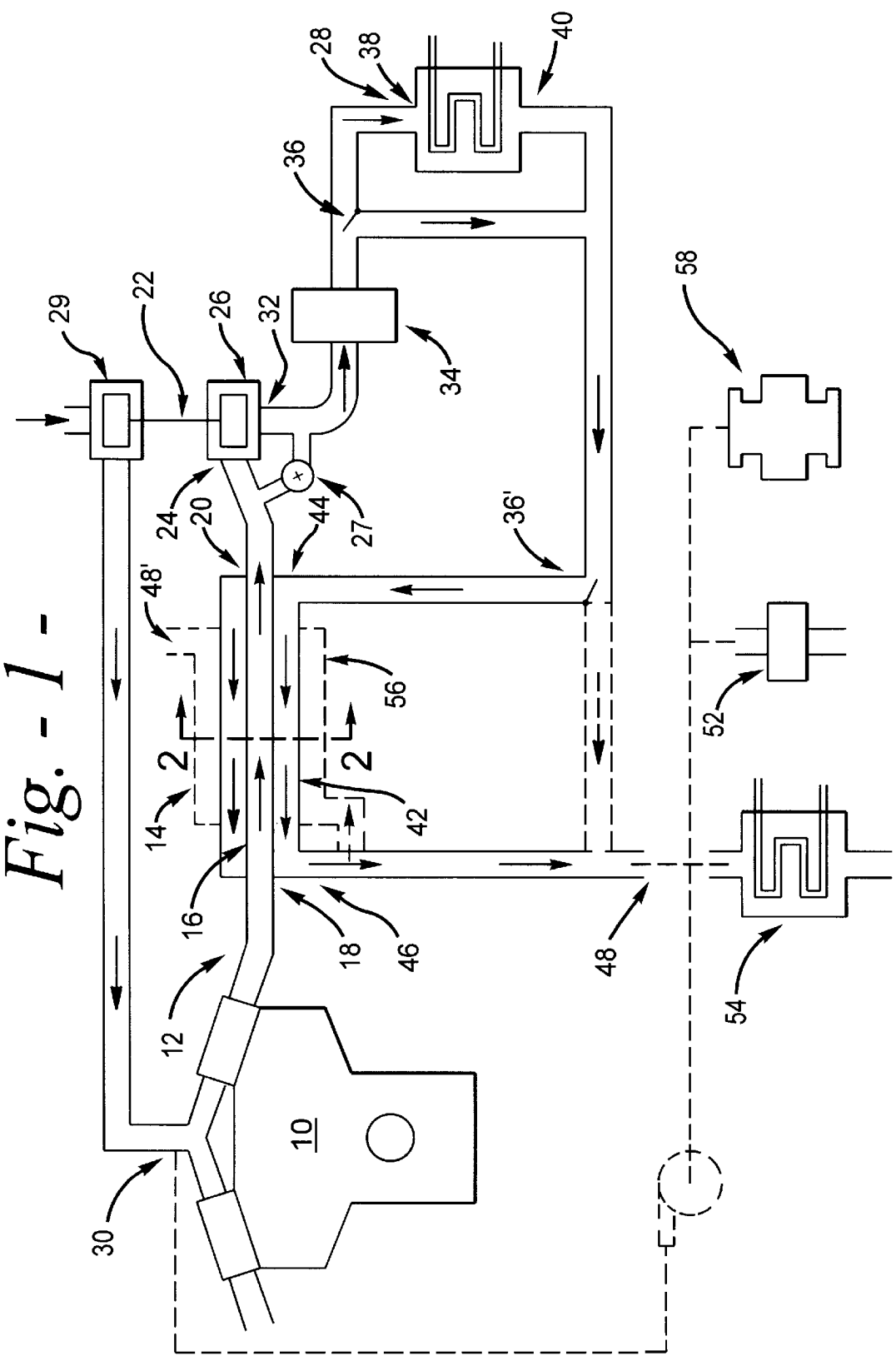
Fig. -1-

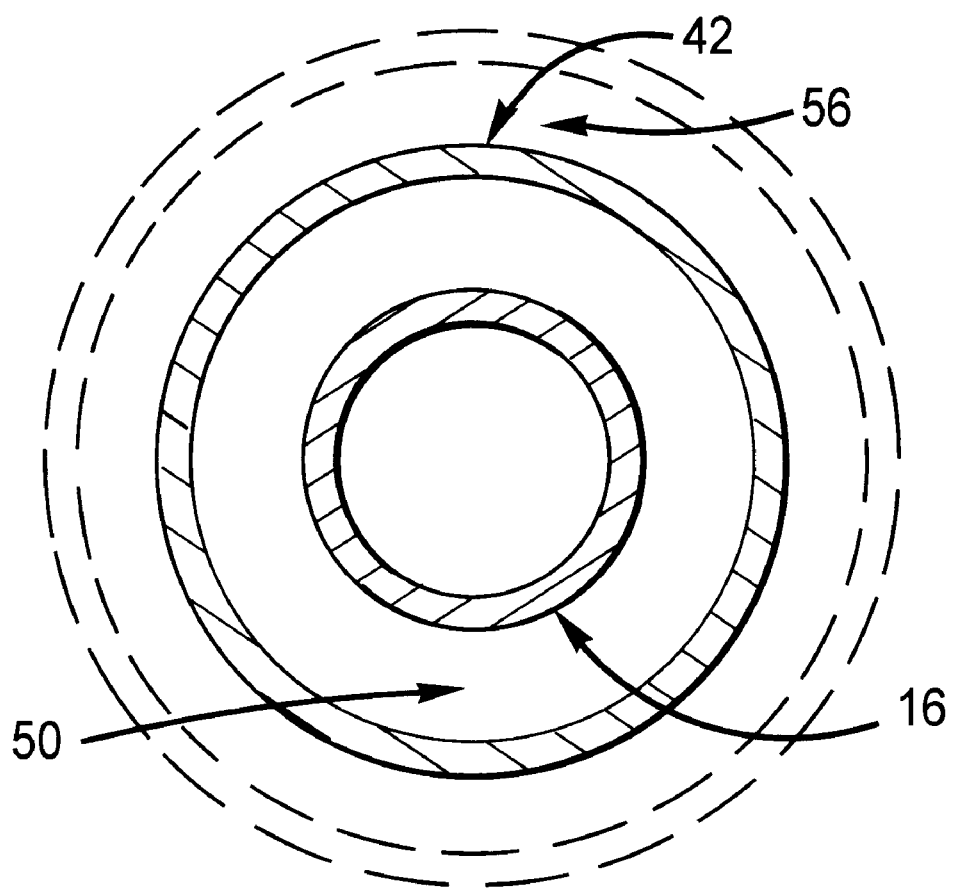
Fig. - 2 -

EXHAUST MANIFOLD COOLING ASSEMBLY FOR AN INTERNAL COMBUSTION ENGINE

TECHNICAL FIELD

This invention relates generally to an exhaust manifold cooling assembly for use with an internal combustion engine and more particularly to the exhaust manifold assembly being cooled by cooled exhaust gas.

BACKGROUND ART

In modern engine technology, turbochargers are powered by the hot exhaust gas from the engine. It is desirable to convey the hot exhaust gas from the engine to the turbocharger in as high a temperature state as is possible. Some engine applications may make use of the exhaust's thermal heat. Recovery of the engine's wasted exhaust gas thermal heat may be used for warming residential living, factory assembly spaces, and the like depending on engine application. Recovery of the thermal heat is typically desirable at high heat rejection temperatures to allow for a more compact cooling system design. It is also desirable to maintain the temperature of the exhaust manifold below a predetermined temperature, such as below 750 degrees C. Prior techniques provide water jackets disposed about exhaust manifolds to reduce the temperature of the manifold. Unfortunately, the use of water jackets reduces the temperature of the exhaust gas, thereby reducing the energy supplied to the turbocharger and also the temperature of recoverable heat energy.

Some attempts have been made to produce a manifold with temperatures within allowable limits and, at the same time, to maintain the temperature of the exhaust gas as high as possible. One such system provides a sleeve inside the manifold which is surrounded by an air space. The air space provides insulation for the hot exhaust gas to keep their temperature as high as possible and, at the same time, to reduce the amount of heat transmitted to the water of the water jacket. That system also provides for accommodating for the heat insulating sleeve increasing in diameter under the expansion caused by the hot exhaust gas. In addition, in at least one version of said prior device, the heat insulation sleeve is cast in place in the manifold which makes it almost impossible to replace the heat insulation sleeve when it deteriorates or fails.

Another device, insulation material is provided around a heat insulating sleeve and a specially designed sliding connection is provided between the sleeve and a tube extending from each exhaust port of the engine. These connections are complicated, expensive and substantially impossible to maintain and service.

In another device, heat insulation is provided between the inner sleeve and an intermediate sleeve, with the inner sleeve being capable of axial movement against specially designed collapsible gaskets located between adjoining ends of the sleeves.

Another device discloses a manifold wherein the outer shell of the manifold is made in two parts which parts are assembled around an inner shell of the manifold so as to form a water jacket for cooling the inner shell with no insulation being provided for the inner shell.

The present invention is directed to overcoming one or more of the problems as set forth above.

DISCLOSURE OF THE INVENTION

In one aspect of the invention an exhaust manifold cooling assembly for an internal combustion engine comprises a turbocharger, an exhaust manifold, a heat exchanger, and an outer shell. The turbocharger has a turbine section. The turbine section has an inlet end and an outlet end. The exhaust manifold has an exhaust inlet portion and an exhaust outlet portion. The exhaust inlet portion is connected to the engine and the exhaust outlet portion is connected to the inlet end of the turbine section. The exhaust manifold passes heated exhaust gas from the engine to the inlet end of the turbine section. The heat exchanger has an inlet end and an outlet end. The inlet end is connected to the outlet end of the turbocharger. The heat exchanger is adapted to cool heated exhaust gas passed from the outlet end of the turbine section. The outer shell has an inlet portion and an outlet portion. The outer shell defines a cooling spaced passageway disposed about and generally surrounds the exhaust manifold. The inlet portion of the outer shell is connected to the outlet end of the heat exchanger and the outlet portion is connected to an opening. The outer shell passes cooled exhaust gas from the outlet end of the heat exchanger to the opening.

In another aspect of the present invention a method for cooling an exhaust manifold assembly for an internal combustion engine having a heat exchanger, an exhaust manifold, and an outer shell disposed about the exhaust manifold comprises the following steps. Passing exhaust gas from the engine through the exhaust manifold into the heat exchanger. Cooling the exhaust gas with the heat exchanger. Passing the cooled exhaust gas from the heat exchanger, through the outer shell and about the exhaust manifold. The cooled exhaust gas absorbs heat from the exhaust manifold.

BRIEF DESCRIPTION OF THE DRAWINGS

FIG. 1 is a diagrammatic schematic of an exhaust manifold cooling assembly for an internal combustion engine showing an embodiment of the present invention; and FIG. 2 is a diagrammatic cross-sectional view taken along line 2—2 of FIG. 1 showing an embodiment of the present invention.

BEST MODE FOR CARRY OUT THE INVENTION

Referring to FIG.1, an internal combustion engine 10 is shown. Typical engine operation passes air through intake valves (not shown) into a combustion chamber (not shown). The intake valves are closed based on engine operating parameters, i.e. engine timing. With the intake valves closed or partially closed for engines 10 operating with retarded timing, a crankshaft (not shown) is rotated moving a piston (not shown) towards top dead center. The piston compresses the air in the combustion chamber. An injector (not shown) injects a quantity of fuel into the combustion chamber, generally when the piston is close to top dead center. The air mixes with the fuel which is ignited thereby causing combustion to take place. The combustion byproducts, i.e. exhaust gas 12 are then passed through exhaust valves (not shown). It is to be understood that the mixing of the air and fuel may take place upstream from the combustion chamber and ignited by a spark plug (not shown), glow plug (not shown), and the like.

An exhaust manifold assembly's 14 exhaust manifold 16 has an exhaust inlet portion 18 and an exhaust outlet portion 20 for passing exhaust gas 12 from the engine exhaust valves to a turbocharger 22. However, it should be recognized that engine exhaust manifolds 16 may be used in applications that do not have turbochargers 22 without departing from the spirit of the invention.

The exhaust inlet portion 18 of the exhaust manifold 16 is connected to the engine 10. The exhaust inlet portion 18 is typically connected to the engine 10 using fasteners (not shown), such as bolts, studs, and the like. Having the exhaust inlet portion 18 of the exhaust manifold 16 connected to the engine 10 provides alignment between the exhaust manifold 16 and exhaust ports (not shown) which are located in the cylinder head (not shown). Alignment of the exhaust ports and the exhaust inlet portion 18 allows the exhaust gas 12 to pass from the engine 10 through the exhaust manifold 16.

The exhaust outlet portion 20 of the exhaust manifold assembly 14 is connected to an inlet end 24 of a turbine section 26 of the turbocharger 22. However, it should be recognized that a by-pass conduit 27 may be used to pass exhaust gas from the manifold assembly 14 to a heat exchanger 28 without departing from the spirit of the invention. The amount of exhaust passed through the by-pass conduit 27 may be controlled by devices, such as wastegate valves, butterfly valves, electronic valves, hydraulic valves, and the like without departing from the spirit of the invention. The turbine section 26 is drivingly connected to a compressor section 29 of the turbocharger 22 for compressing fresh air. The compressed fresh air is then passed to an intake manifold 30 of the engine 10. The turbine section 26 also has an outlet end 32 for fluidly communicating exhaust gas 12 from the turbine section 26 to the heat exchanger 28. It should be recognized that, a primary catalytic converter 34 may be disposed in fluid communication with the exhaust gas between the heat exchanger 28 and the exhaust manifold 16 without departing from the invention.

A control valve 36 may be inserted between the outlet end 32 of the turbine section 26 and the heat exchanger 28 to provide control of exhaust gas 12. The control valve 36 allows exhaust gas 12 to pass to the heat exchanger 28 from the turbine section 26. A butterfly valve 36 may be used to allow exhaust gas 12 to be communicated between the outlet end 32 of the turbine section 26 and the heat exchanger 28. However, other valves or a valve system of multiple valves may be used, such as electronic valves, hydraulic valves, and the like without departing from the spirit of the invention. The control valve 36 has a closed position permitting the exhaust gas 12 to by-pass the heat exchanger 28 and an open position in which exhaust gas 12 passes to the heat exchanger 28. This closed position typically corresponds when the engine 10 is operating at generally low exhaust temperatures. Engines 10 operating at low exhaust temperature typically occur at start up or part load conditions but other conditions may be used to place the control valve 36 in a closed position or partially closed position without departing from the spirit of the invention.

A second control valve 36' may be used singularly or in combination with the control valve 36 for by-passing exhaust gas directly from the heat exchanger 28 to the atmosphere. Some applications may provide a cooled exhaust elbow disposed between the outlet end 32 of the turbine section 26 and the heat exchanger 28 without departing from the spirit of the invention.

The heat exchanger 28 typically has an inlet portion 38 and an outlet portion 40. The heat exchanger 28 cools the exhaust gas 12 for communicating cooled exhaust gas 12 to an outer shell 42 of the exhaust manifold assembly 14. The outer shell 42 will be discussed in more detail below. The inlet portion 38 is connected to the outlet end 32 of the turbine section 26 of the turbocharger 22 using techniques that are well known in the art. The heat exchanger 28 is adapted for cooling the heated exhaust gas 12 passed from the outlet end 32 of the turbine section 26. Cooling of the heated exhaust gas 12 is typically achieved using an air to air aftercooler, water cooling, counter-flow primary surface cooling, and the like without departing from the spirit of the invention.

The outer shell 42 as shown in FIG.1 and FIG.2 has an inlet portion 44 and an outlet portion 46 for passing exhaust gas 12. The exhaust gas 12 passing through the outer shell 42 has been cooled by the heat exchanger 28, i.e. cooled exhaust gas 12 is passed through the outer shell 42 to an opening 48. The outer shell 42 defines a cooling spaced passageway 50 disposed about and generally surrounds the exhaust manifold 16. The outer shell 42 is typically constructed from a material, such as iron and the like. The outer shell 42 may be water cooled. The inlet portion 44 of the outer shell 42 is connected to the outlet portion 40 of the heat exchanger 28 using techniques that are well known in the art. The outlet portion of the shell is connected to the opening 48 or passing the exhaust gas 12 from the shell to a catalytic converter 52, atmosphere, second heat exchanger 54, second cooling spaced passage 56, intake manifold 30, muffler 58, and the like.

Another embodiment of the instant invention may have exhaust gas 12 passing through the second heat exchanger 54 to re-cool the exhaust gas 12 to a temperature suitable for thermal heat recovery. The recovered thermal heat may be used to heat the surrounding area, such as residential living, factory assembly spaces, and the like. However, it should be recognized that recovery of thermal heat may be accomplished without using the second heat exchanger 54 without departing from the spirit of the invention.

In yet another embodiment, the opening 48 of the outer portion of the outer shell 42 may be connected to the intake manifold 30 for exhaust gas recirculation. The exhaust gas 12 passing through the cooling spaced passageway 50 of the outer shell 42 absorbs heat from the exhaust gas 12 passing through the exhaust manifold 16. The absorption of heat from the exhaust gas 12 passing through the exhaust manifold 16 by the cooled exhaust gas 12 passing through the outer shell 42 increases the temperature of the cooled exhaust gas 12. The cooled exhaust gas 12 that has been warmed has a temperature generally adequate for providing exhaust gas recirculation. However, it should be recognized that having the second heat exchanger 54 disposed between the opening 48 and the intake manifold 30 may be used without departing from the spirit of the invention.

In yet another embodiment, the opening 48 is in fluid communication with the catalytic converter 52. The temperature of the exhaust gas 12 passing through the cooling space passageway of the outer shell 42 has been heated to a temperature level suitable for reacting with the catalytic converter 52. This reaction lowers emission levels of the exhaust gas 12 before being expelled to the atmosphere.

In yet another embodiment, the outer shell 42 may have a second cooling passageway disposed about and generally surrounding the cooling spaced passageway 50 of the outer shell 42. The second cooling spaced passageway 56 has a second opening 48' for passing exhaust gas from the outer shell to the appropriate devices as described for the opening 48 without departing from the spirit of the invention. Having the exhaust gas 12 pass through multiple cooling passageways allows optimization between the temperature of exhaust gas 12 and turbocharger 22 efficiency.

INDUSTRIAL APPLICABILITY

In operation, the exhaust manifold assembly 14 is fastened to the engine 10 using fasteners. Proper sealing between the exhaust manifold assembly 14 and the engine 10 is generally achieved using gaskets. The exhaust manifold assembly 14 is aligned with the exhaust ports for communication of exhaust gas 12 from the engine 10 through the exhaust manifold 16 to the turbine section 26 of the turbocharger 22. The exhaust gas 12 drives the turbine section 26 of the turbocharger 22 which is operatively connected to the compressor section 29 of the turbocharger 22. The compressor section 29 compresses the fresh air and routes the compressed air to the intake manifold 30 of the engine 10. The exhaust gas 12 drives the turbine section 26 of the turbocharger 22 before passing through the outlet end 32 of the turbine section 26 to the heat exchanger 28 continuing to pass through the cooling spaced passageway 50 depending on the position of the control valve 36.

The control valve 36 which limits the amount of exhaust gas 12 passed to the heat exchanger 28 has a closed position where the exhaust gas 12 by-passes the heat exchanger 28. Having the control valve 36 in the open position allows the exhaust gas 12 to enter the inlet portion 38 of the heat exchanger 28 to cool the exhaust gas 12. The control valve 36 may be at a position intermediate to the open and closed position to allow a portion of the exhaust gas 12 to pass through the inlet portion 38 of the heat exchanger 28 while also by-passing the remainder portion of exhaust gas 12.

The heat exchanger 28 cools the exhaust gas 12 passed through the inlet portion 38. The cooled exhaust gas 12 exits through the outlet portion 40 of the heat exchanger 28 into the outer shell 42. The cooled exhaust gas 12 is passed through the outer shell 42, in particular through the cooling spaced passageway 50 thereby providing a cooling medium for absorbing heat from the exhaust manifold 16. The exhaust gas 12 passes through the outer shell 42 of the exhaust manifold 16 through the opening 48 for rejection into the atmosphere, recirculation into the intake manifold 30, cooling by the second heat exchanger 54, and the like. The exhaust gas 12 passing through the outer shell 42 may also be repassed through the second cooling passageway of the outer shell 42 to provide additional cooling of the exhaust manifold assembly 14. The opening 48' may provide passing of exhaust gas 12 to the catalytic converter 52 for emission treatment before expelling the exhaust gas 12 to the atmosphere.

A method for cooling an exhaust manifold assembly 14 for an internal combustion engines 10 having the heat exchanger 28, the exhaust manifold 16, and the outer shell 42 disposed about the exhaust manifold 16. The exhaust gas 12 is passed from the engine 10 through the exhaust manifold 16 into the heat exchanger 28. The exhaust gas 12 passes through the exhaust manifold 16 and is cooled using the heat exchanger 28 as previously described. The cooled exhaust gas 12 exiting from the heat exchanger 28 passes through the outer shell 42 which is disposed about the exhaust manifold 16. The cooled exhaust absorbs heat form the exhaust gas 12 passing through the exhaust manifold 16. The cooled exhaust gas 12 may absorb enough heat to increase the temperature level of the cooled exhaust to a temperature level requiring addition of the second heat exchanger 54. The second heat exchanger 54 is used to re-cool the exhaust gas 12. The cooled exhaust gas 12 may be recovered with or without the use of the second heat exchanger 54 for providing heat to the surrounding area which has been described in detail previously. Another embodiment may re-pass the cooled exhaust gas 12 through the outer shell 42 to further cool the exhaust manifold assembly 14. The exhaust gas 12 that has passed through the outer shell 42 may also be passed into the intake manifold 30 for mixing with the fresh air stream.

Exhaust manifold assemblies 14 that have the cooling spaced cavity disposed about the exhaust manifold 16 allows the exhaust manifold 16 to be made from common and low cost materials, such as cast iron. Having a dry exhaust manifold significantly improves exhaust energy needed to efficiently drive the turbocharger 22 as compared with wet manifold designs. The wet manifold absorbs a larger quantity of heat from the exhaust gas 12 thereby lowering the efficiency of the turbocharger 22 and also the amount of energy needed for compressing fresh air. The exhaust manifold assembly 14 of the instant application also keeps the exhaust manifold 16 from burning, melting, or otherwise damaging nearby engine electronics, wiring, or low temperature components. Using the cooled exhaust gas 12 maintains long life of the exhaust manifold 16 and also increases the amount of recoverable heat from the engine 10 as compared to prior exhaust manifold 16.

Other aspects, objects and advantages of this invention can be obtained from a study of the drawings, the disclosure, and the appended claims.

What is claimed is:

1. An exhaust manifold cooling assembly for an internal combustion engine, comprising:
   a turbocharger having a turbine section, said turbine section having an inlet end and an outlet end;
   an exhaust manifold having an exhaust inlet portion and an exhaust outlet portion, said exhaust inlet portion being connected to the engine and said exhaust outlet portion being connected to the inlet end of the turbine section, and said exhaust manifold passing heated exhaust gas from the engine to said inlet end of the turbine section;
   a heat exchanger having an inlet end and an outlet end, said inlet end being connected to the outlet end of the turbocharger, and said heat exchanger being adapted to cool heated exhaust gas being passed from the outlet end of the turbine section; and
   an outer shell having an inlet portion and an outlet portion, said outer shell defining a cooling spaced passageway being disposed about and generally surrounding said exhaust manifold, said inlet portion of said outer shell being connected to the outlet end of the heat exchanger and said outlet portion being connected to an opening, and said outer shell passing cooled exhaust gas from the outlet end of the heat exchanger to said opening.

2. An exhaust manifold cooling assembly, as set forth in claim 1, wherein said cooled exhaust gas is passed from said opening through a second heat exchanger.

3. An exhaust manifold cooling assembly, as set forth in claim 2, wherein said cooled exhaust gas that is passed through said second heat exchanger having a portion of thermal heat energy being recovered.

4. An exhaust manifold cooling assembly, as set forth in claim 1, wherein said opening being connected to an inlet manifold.

5. An exhaust manifold cooling system, as set forth in claim 1, wherein said opening being connected to a catalytic converter.

6. An exhaust manifold cooling system, as set forth in claim 1, wherein said outer shell being water cooled.

7. An exhaust manifold cooling system, as set forth in claim 1, wherein said outer shell having a second cooling spaced passageway being disposed about and generally surrounding said cooling spaced passageway.

8. An exhaust manifold cooling system, as set forth in claim 1, wherein said outlet end of said turbine section having a control valve.

9. An exhaust manifold cooling system, as set forth in claim 8, wherein said control valve being in a closed position having said exhaust gas bypassing said heat exchanger corresponding to a generally low exhaust temperature.

10. A method for cooling an exhaust manifold assembly for an internal combustion engine having a heat exchanger, an exhaust manifold, and an outer shell disposed about the exhaust manifold, comprising the steps of:

passing exhaust gas from the engine through said exhaust manifold into the heat exchanger;

cooling said exhaust gas with said heat exchanger; and passing said cooled exhaust gas from the heat exchanger, through the outer shell and about the exhaust manifold, said cooled exhaust gas absorbing heat from the exhaust manifold.

11. A method for cooling an exhaust manifold assembly, as set forth in claim 10, wherein said step of passing said cooled exhaust gas comprises a second heat exchanger.

12. A method for cooling an exhaust manifold assembly, as set forth in claim 11, wherein said step of passing said cooled exhaust through said second heat exchanger having a portion of thermal heat being recovered.

13. A method for cooling an exhaust manifold assembly, as set forth in claim 10, wherein said step of passing said cooled exhaust gas comprises re-passing of cooled exhaust gas about the outer shell.

14. A method for cooling an exhaust manifold assembly, as set forth in claim 10, including an inlet manifold and wherein said step of passing said cooled exhaust gas comprises passing of cooled exhaust gas from said outer shell into said inlet manifold.

15. A method for cooling an exhaust manifold assembly, as set forth in claim 10, wherein said step of passing exhaust gas comprises passing of exhaust gas from said exhaust manifold through a turbocharger into the heat exchanger.

16. A method for cooling an exhaust manifold assembly, as set forth in claim 15, wherein said step of passing exhaust gas comprises by-passing exhaust gas from said heat exchanger for a generally low temperature exhaust gas.

* * * * *